(12) United States Patent
Shimoda et al.

(10) Patent No.: US 6,744,582 B2
(45) Date of Patent: Jun. 1, 2004

(54) THERMAL-ASSISTED MAGNETIC STORAGE DEVICE AND METHOD FOR DRIVING THE READING/WRITING HEAD THEREOF

(75) Inventors: Kazumasa Shimoda, Isehara (JP); Takuya Uzumaki, Zama (JP)

(73) Assignee: Fujitsu Limited, Kawasaki (JP)

(*) Notice: Subject to any disclaimer, the term of this patent is extended or adjusted under 35 U.S.C. 154(b) by 383 days.

(21) Appl. No.: 09/907,988

(22) Filed: Jul. 18, 2001

(65) Prior Publication Data
US 2002/0008930 A1 Jan. 24, 2002

(30) Foreign Application Priority Data
Jul. 18, 2000 (JP) .......................... 2000-217896

(51) Int. Cl.[7] .......................... G11B 5/02; G11B 5/596; G11B 11/00; G11B 11/10
(52) U.S. Cl. .................. 360/59; 360/77.03; 369/13.11; 369/13.12; 369/13.2
(58) Field of Search ................ 360/59, 77.03; 369/13.11, 13.12, 13.17, 13.2, 13.21, 13.14; G11B 5/02, 5/596, 11/00, 11/10

(56) References Cited

U.S. PATENT DOCUMENTS

| | | | |
|---|---|---|---|
| 5,239,532 A | * | 8/1993 | Hensing et al. .............. 369/215 |
| 5,416,753 A | * | 5/1995 | Kanazawa et al. ........ 369/13.17 |
| 6,404,705 B1 | * | 6/2002 | Watanabe et al. ......... 369/13.14 |
| 6,515,943 B1 | * | 2/2003 | Nishimoto ................ 369/13.17 |

FOREIGN PATENT DOCUMENTS

| | | | | |
|---|---|---|---|---|
| JP | 05182286 A | * | 7/1993 | ........... G11B/11/10 |
| JP | 05325305 A | * | 12/1993 | ........... G11B/11/10 |

* cited by examiner

Primary Examiner—David Hudspeth
Assistant Examiner—Dan I Davidson
(74) Attorney, Agent, or Firm—Greer, Burns & Crain, Ltd.

(57) ABSTRACT

A thermal-assisted magnetic storage device includes a magnetic recording media of a transparent material, a first marker of a material that is optically singular compared with materials therearound, and a magnetic head disposed on a magnetic head slider facing a recording surface of the magnetic recording media. A light-beam pickup faces the other surface of the magnetic recording media, so as to emit light therefrom to the surface of the magnetic recording media. A second marker is disposed on the magnetic head slider for roughly guiding the light to the first marker. An alignment between the light and the magnetic head is performed in accordance with the light reflected from the first marker.

15 Claims, 10 Drawing Sheets

REFLECTIVE INDEX
DIFFERENTIATION TYPE MARKER
(CROSS-SECTION OF SLIDER)

ROUGHNESS TYPE MARKER
(CROSS-SECTION)

LASER BUMP TYPE MARKER
(CROSS-SECTION)

(a) JUST AFTER ALIGNMENT (b) ONE HOUR AFTER ALIGNMENT (a) JUST AFTER ALIGNMENT (b) ONE HOUR AFTER ALIGNMENT

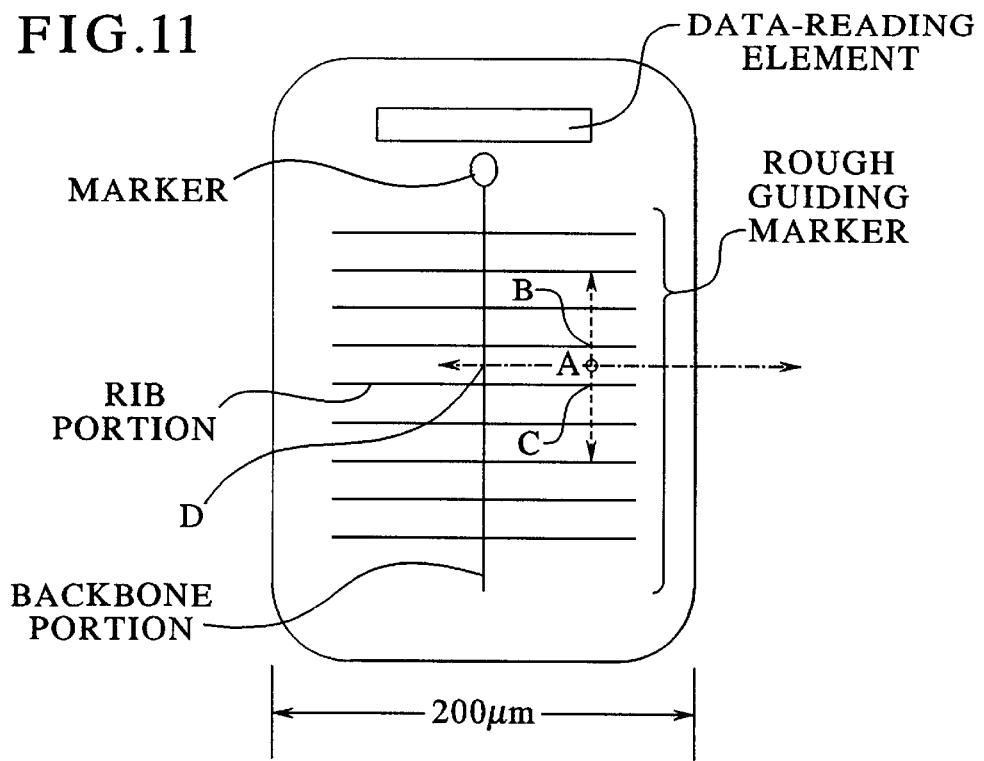
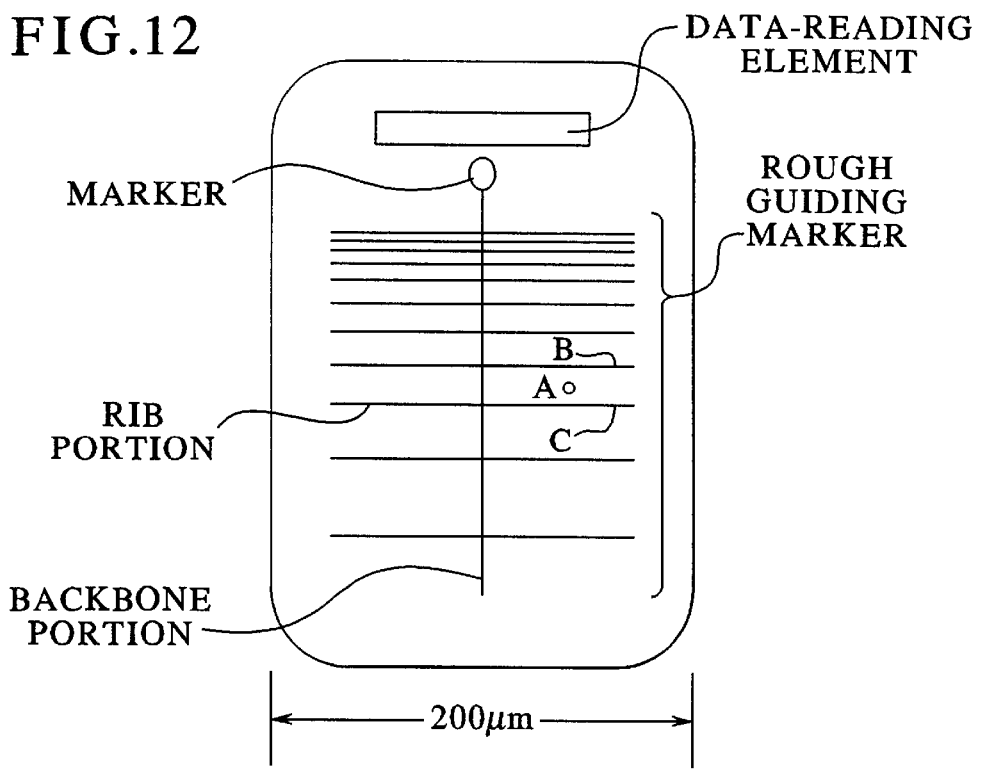

THERMAL-ASSISTED MAGNETIC STORAGE DEVICE AND METHOD FOR DRIVING THE READING/WRITING HEAD THEREOF

CROSS-REFERENCE TO RELATED APPLICATION

This application is based upon and claims priority of Japanese Patent Application No. 2000-217896, filed Jul. 18, 2000, the contents being incorporated herein by reference.

BACKGROUND OF THE INVENTION

1. Field of the Invention

The present invention relates to a magnetic storage device technology, which has been broadly applied to several hardware, e.g., personal computers and workstations, in information technologies field. In detail, the present invention relates especially to a thermal-assisted (or light-assisted) magnetic storage device technology to realize gigantic memory capacity without enlarging its current physical size.

Nowadays, acceleration of the information technologies demands higher memory capacity and smaller physical size for magnetic storage device, and there is a demand for a reliable data reading technology for realizing accurate reading of data without errors even from tiny field on very high density storage media surface. According to such technical background, a thermal-assisted magnetic storage device has been introduced, and it is to improve magnetic storage media's coercive force through a thermal assist data writing accompanied by focused light beam. Namely, when writing data on the magnetic storage media, the magnetic storage media surface to be written a datum is thermally annealed and thereby the coercive force of the data-writing portion on the magnetic storage media surface becomes lower compared with prior to the thermal annealing. The present invention relates to an improvement for realizing accurate alignment between the magnetic write head and a light-beam pickup in the thermal-assisted magnetic storage device, in which the magnetic write head and the light-beam pickup are disposed at both sides of one magnetic storage disc medium.

2. Discussion of the Related Art

As exemplified in FIG. 1, the thermal-assisted magnetic storage device employs a magnetic storage disc as magnetic storage media and a magnetic head to which the surface of the magnetic storage disc is adjacent, and thereby a magnetic sensor formed on the magnetic head is capable of reading storage data as magnetic information on the surface of the magnetic storage disc. And further, the light-beam is led to the magnetic head through fine glass fiber along with holding spring for holding the magnetic head, and thereby the light-beam can arrive at the magnetic disc substrate surface. Through such structure as in the above, tiny spot on the magnetic disc surface can be partially heated by being exposed to the light-beam. Such thermal-assisted magnetic storage device has been proposed.

However, such technique as in the above can be hardly applied to the high-density magnetic recording storage device although it might be applied to conventional level low-density magnetic storage device. That is to say, in conventional technology situation, no serious problem could be raised, because width of one magnetic recorded data occupied field, i.e., so-called 'Tracking-pitch', is much larger compared with a distance between the magnetic sensor and the light-beam spot although the end portion of the glass fiber is disposed to the magnetic head. On the other hand, in much higher density magnetic storage device technology, as the tracking-pitch becomes to be smaller than the distance between the magnetic sensor and the light-beam spot, the magnetic recording disc surface itself can be hardly heated by exposing the light beam. As a result of this problem, the thermal-assistance function of the thermal-assisted magnetic storage device will not be able to fully obtain the desired effect. Thus, in case that the thermal-assistance function is applied to such higher density magnetic storage device, the thermal-assistance function might make no sense.

In such circumstances, another technology is demanded. The magnetic recording disc itself is comprised from transparent material, and light-beam spot is emitted from different side of such transparent magnetic recording disc from the side of the magnetic head. However, because the slider surface of the magnetic head is highly integrated and very small as the same level as cutting edge semiconductor device, light-beam spot can be difficult to align to such very small magnetic sensor.

SUMMARY OF THE INVENTION

As stated in the above, because such high-density recording technology is demanded, the light-beam spot itself also required to be downsized to tiny size, such as in the sub-micron order. And further, the magnetic sensor, which is disposed on the slider surface of the magnetic head is also required to be similarly downsized. If the magnetic sensor and the light-beam spot are not aligned even a bit with each other during a data reading operation, recorded data is undesirably rewritten and therefore recording data error inevitably occurs. Therefore, the alignment technologies which can realize quick and accurate alignment between the magnetic sensor and the light-beam spot, is found as the problem to be improved in the related art.

As a solution against such related art problem, each of following means, for instance, will be applied according to the present invention.

(1) A thermal-assisted magnetic storage device, comprising:
  a magnetic recording media being comprised from transparent material;
  a first marker of optically singular compared with materials therearound;
  a magnetic head disposing on a magnetic head slider, being faced with the recording surface of said magnetic recording media;
  a light-beam pickup disposing on other surface of said magnetic recording media, being at opposite side from said magnetic head, so as to emit light therefrom to the surface of said magnetic recording media, and thereby;
  alignment between said light and said magnetic head is performed in accordance with detecting result of reflective light reflecting from said first marker.

(2) The thermal-assisted magnetic storage device as in (1), further comprising:
  a second marker, by whom light assists rough movement to said first marker position, and disposing on said magnetic head slider side.

(3) The thermal-assisted magnetic storage device as in (2), wherein said second marker is arranged in the direction which becomes a standard where light moves, and so that said first marker is arranged straight in the extension.

(4) The thermal-assisted magnetic storage device as in (2), wherein said second marker is comprised from:

a first line part so that the first above-mentioned marker is arranged in one direction which becomes a moving standard in straight and the extension; and a second line part being the plural in a direction orthogonal for above one side according to the interval with a predetermined order.

(5) The thermal-assisted magnetic storage device as in (4), wherein each of plural of said line parts are arranged at equal intervals.

(6) The thermal-assisted magnetic storage device as in (4), wherein the intervals between the plural of said second line parts are shortened gradually at fixed rate each other in accordance with distance to said first line part.

(7) The thermal-assisted magnetic storage device as in (4) through (6), wherein at least one of said first and second lines are comprised from dotted line.

(8) The thermal-assisted magnetic storage device as in (2), wherein the second marker of said first line part is as said first marker is arranged in one direction which becomes a moving standard in straight and the extension.

(9) The thermal-assisted magnetic storage device as in (8), wherein said first line part is comprised from a dotted line.

(10) The thermal-assisted magnetic storage device as in (4) through (7), wherein said second line part is comprised from zigzag with predetermined cycle which gradually increases or gradually decreases.

(11) The thermal-assisted magnetic storage device as in (10), wherein said cycle is continued from end to end of said second line part.

(12) The thermal-assisted magnetic storage device as in (9), wherein the length of the solid line part of dotted lines among said first line part spreads at a fixed rate in accordance with distance from said first marker.

(13) The thermal-assisted magnetic storage device as in (8) through (12), wherein the interval between said first line part spreads in accordance with distance from said first marker.

(14) The thermal-assisted magnetic storage device as in (1) through (13), wherein at least one of said first and second marker is comprised from at least one element selected from a group of Al (Aluminum), Ag (Silver), and Pt (Platinum), and thereby it has higher reflexibility compared with surroundings.

(15) The thermal-assisted magnetic storage device as in (1) through (13), wherein at least one of said first and second marker is comprised from a roughness on said magnetic head slider.

(16) The thermal-assisted magnetic storage device as in (15), wherein said first and second marker is comprised from a convex part formed heating it by high-energy line irradiation.

(17) A method for driving reading/writing head of a thermal-assisted magnetic storage device, comprising the steps of:
the position matches and has the marker who becomes aim. On the other hand, readout and the writing method of driving the head of the optical assistance magnetism record device to which the above-mentioned position match is induced with the marker for the rough movement installed so that the reflection of the above-mentioned light becomes peculiar when the light irradiated from an optical picking up is matched the position.

(18) The method for driving reading/writing head of a thermal-assisted magnetic storage device as in (17), wherein said rough guiding marker forms straight, and a marker as a target for said alignment is located in the extension.

(19) The method for driving reading/writing head of a thermal-assisted magnetic storage device as in (17), wherein said rough guiding marker is comprised from plural straight pattern, which comprises the rib portion where plural straight parts are composed in parallel in the extension the composition of plural straight markers the match and installing the marker who becomes aim, and going directly.

(20) The method for driving reading/writing head of a thermal-assisted magnetic storage device as in (19), further comprising the steps of:
a step of detecting said rib portion by scanning in the direction which first intersects with said rib portion, after light-beam irradiates to said magnetic head slider side; and a step of detecting said backbone portion by scanning in a parallel direction to said rib portion.

Namely, the present invention is intended to propose following means to solve aforementioned related art's problem. According to the present invention, optically singular marker is formed adjacent to the magnetic sensor of the magnetic head for reading recorded data, and light-beam spot can be aligned to the marker without delay. In detail, the optical marker can be comprised from (a) thin film of optically singular reflection index, or (b) pattern of significant roughness. As an example of (a) above, thin metal film of higher reflection index compared with slider surface, e.g., Al (Aluminum), Pt (Platinum), Ag (Silver), can be employed. And also, as an example of (b) above, either an etched ditch though a method of e.g., FIB (Focused Ion Beam) or RIE (Reactive Ion Etching) or a laser bump through thermally melting by high power laser can be employed.

The light detecting element such as photo diodes is installed in the optical picking up set up at the position where the receiving light of the reflection light on the magnetic head slider side can be done, and the change in reflection light strength can be monitored by this light detecting element. Focus adjusting is performed by driving object lens based on this strength change. The position of an optical spot can be matched to the marker by reading the change in reflection light strength by the resolution of a submicron order by adopting the above-mentioned marker, and when recording, the heating of the record part in the medium becomes possible stably.

Effect of the Invention

A more certain, minuter, more magnetic record by the optical assistance method can be realized to a simple optical assistance magnetism record device which does not do the tracking based upon the technology though it composes so far by the cancellation's of weakening and the output decrease in record information which becomes a problem becoming possible according to this invention. An enough reproduction output can be obtained, and the reproduction's recording and operating become possible stably consequently the hard disk drive of super high recording density because the record part in the medium can be stably heated up when recording by using the present invention.

BRIEF DESCRIPTION OF THE DRAWINGS

FIG. 11: The explanatory figure of the alignment steps according to the first embodiment of the present invention (Enlarged plan view of the magnetic head slider)

FIG. 12: The explanatory figure of the first modification of the embodiment (Enlarged plan view of the magnetic head slider)

DETAILED DESCRIPTION

Reference is now made in detail to specific embodiments of the present invention that illustrates the best mode presently contemplated by the inventors for practicing the invention.

First Embodiment

Figure 1:
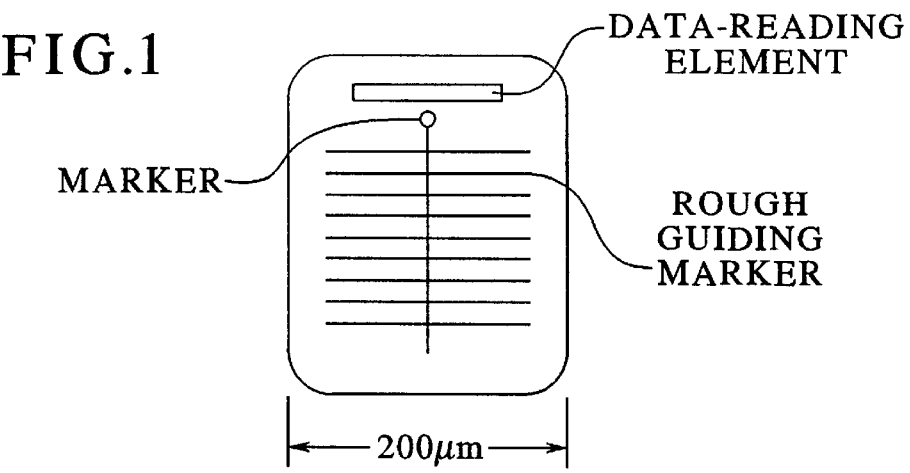
FIG. 1: Plan view (Enlarged plan view of a main portion) of the magnetic head of the thermal-assisted magnetic storage device, according to the first embodiment of the present invention
Figure 2:
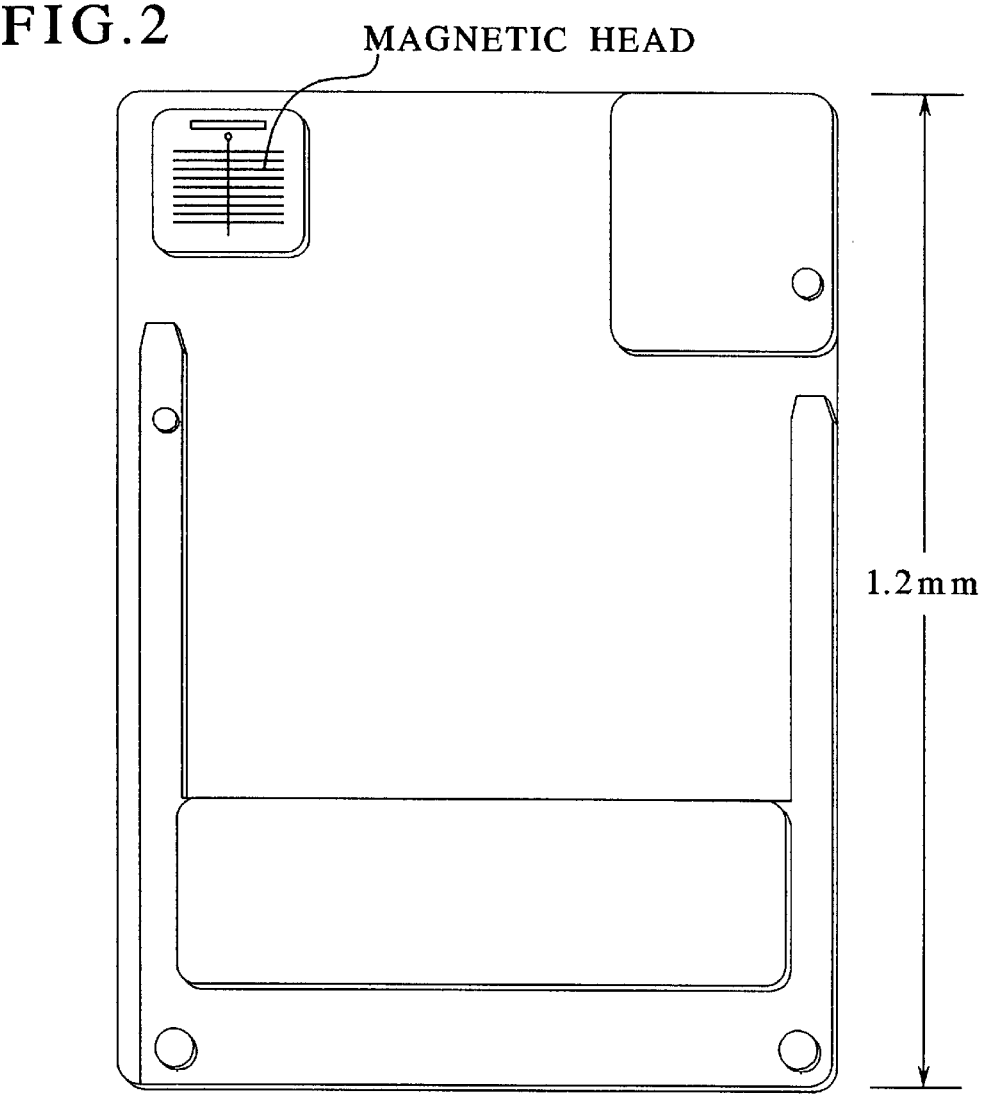
FIG. 2: Plan view of the magnetic head of the thermal-assisted magnetic storage device, according to the first embodiment of the present invention
Figure 3:
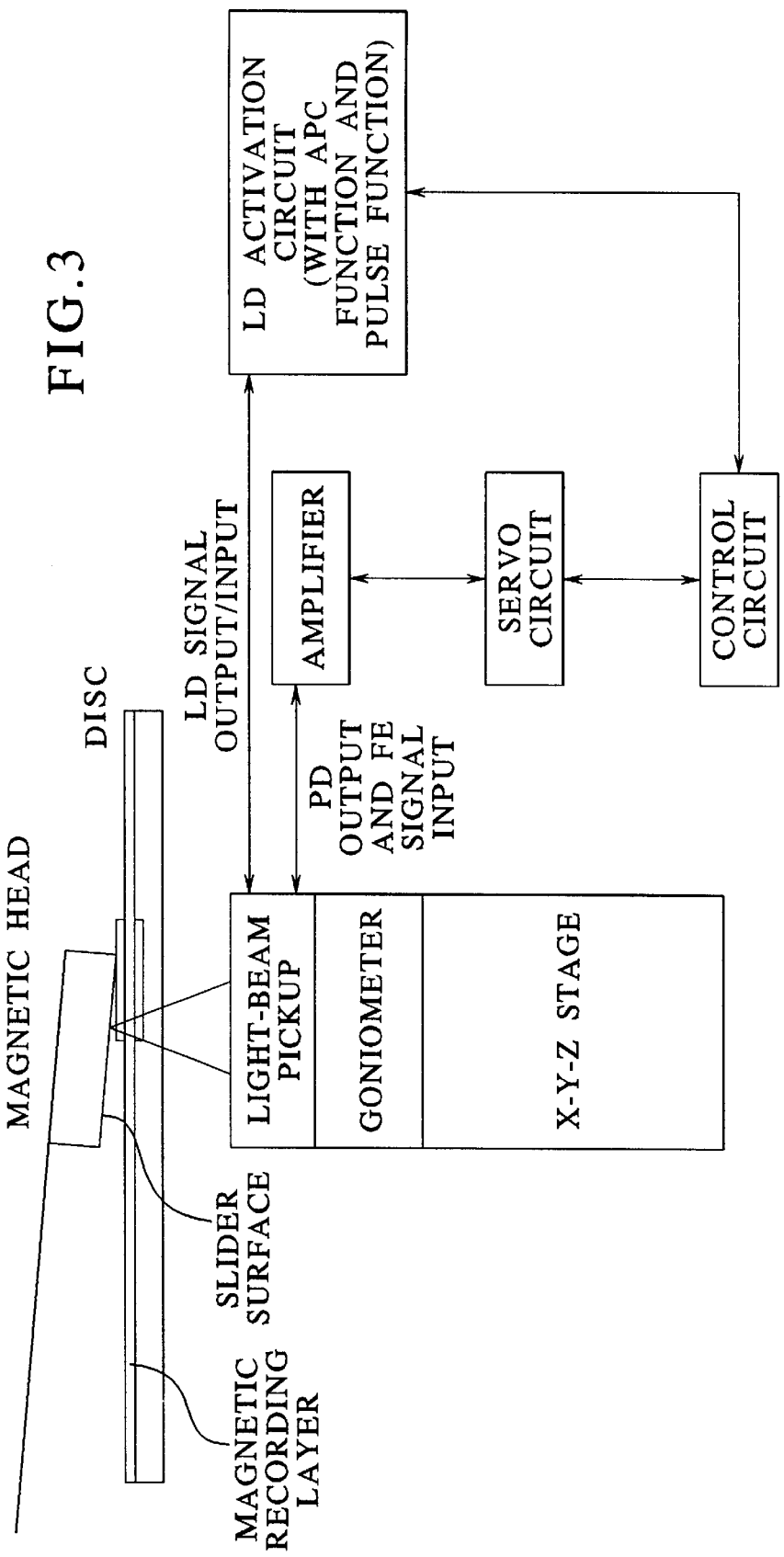
FIG. 3: Structural view of the thermal-assisted magnetic storage device according to the first embodiment of the present invention

FIG. 1 is a plan view figure (Enlarged plan view of a main portion) of the magnetic head of the thermal-assisted magnetic storage device, according to the first embodiment of the present invention. FIG. 2 is a plan view figure of the magnetic head of the thermal-assisted magnetic storage device, according to the present invention. And further, FIG. 3 is a structural view figure of the thermal-assisted magnetic storage device according to the first embodiment of the present invention. Referring to these figures, the first embodiment of the present invention will be explained hereinbelow.

Referring to FIGS. 1 through 3

The magnetic head surface, which is faced to the disc surface, is as illustrated in FIG. 1. And also, the magnetic head comprises the magnetic head slider, which is only 1.2 mm long and thereby has very tiny surface structure, as illustrated in FIG. 3. And also, the magnetic head, which is connected to an arm, can be floated just a bit above the magnetic disc, which rotates very speedy so as to generate tiny swirls enough to make the magnetic head float, and thereby the floating magnetic head can read data recorded on the magnetic storage disc. However, the magnetic head employing actual data reading from magnetic disc surface is only a small portion of the surface, as illustrated in FIG. 3. If enlarged, it has a structure as illustrated in FIG. 2. The magnetic head is formed in a small area of no more than approx. 200 μm width, as in the FIG. 2, and also a data reading element is formed likely as fine pattern located in a portion of such small area.

The alignment, which is the object of the present invention, shall be performed so as to align to the data-reading element, which is a fine pattern in a very small area. Meanwhile, light-beam spot, e.g., laser spot, should not directly expose to the data reading element. This is because high energy of the laser spot might be degraded even in case of short time exposure. Thus, the optically singular marker is set aside a portion adjacent to the data reading element and is used as a target of alignment, and thereby laser spot's long-time direct exposure to the data reading element can be avoidable.

Figure 4:
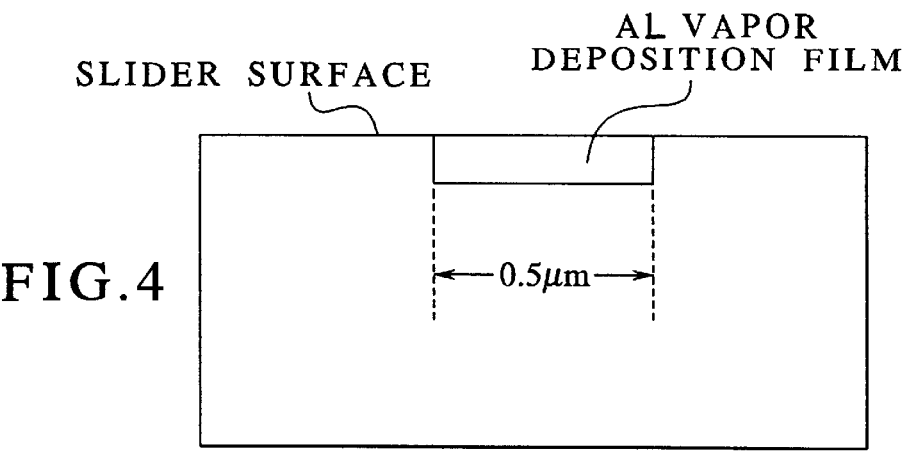
FIG. 4: Cross-sectional view of the magnetic head slider (reflective index differentiation type marker) according to the first embodiment of the present invention

Referring to FIG. 4

FIG. 4 is a cross-sectional view figure of the magnetic head slider (reflective index differentiation type marker) according to the first embodiment of the present invention. In this embodiment, although the magnetic head slider surface is commonly comprised from metal material, the optical marker 2 can be comprised from some glitter material, which can be reflective index can be significantly high, e.g., vapor-deposited metal such as aluminum or gold. The formation of the optical marker is, for instance, as follows. First, a photoresist film is formed on the surface of the magnetic head slider, and a window opening in desired portion is patterned through a known photolithographic method. After that, dry etching is applied by using the patterned photoresist film as a mask so as to an etched ditch in the magnetic head slider surface. And further, aluminum is deposited through a conventional sputtering on the whole surface of the magnetic head slider including the etched ditch. Moreover, aluminum on the outer surface of the etched ditch on the magnetic head slider surface is etched back through CMP (chemical Mechanical Polishing) technique so as not to etch aluminum from the etched ditch, and thereby the optical marker 2 as illustrated in FIG. 4.

Referring again to FIG. 2

Referring again to FIG. 2, plan view figure of the magnetic head of the thermal-assisted magnetic storage device, according to the first embodiment of the present invention, the structural feature of the magnetic head will be explained hereinafter. It is difficult and ineffective to search for the location of the optically singular marker 2, which is to be a target of the light alignment and is formed adjacent to the data reading element 1, without any guidance. Due to lack of guidance, it will take a long time to recognize accurate location of the optically singular marker 2. Thus, according to the present invention, a rough guiding marker 3, which is also optically singular compared to the magnetic head surface, is employed so as to lead the light-beam spot to the marker 2. When the light-beam spot scans on the surface of the magnetic head slider, the light-beam spot will be moved toward basically two directions, i.e., x-axis direction and y-axis direction falling at right angles with the x-axis. In such ways, if plural rough guiding markers 3 of fine line shape are disposed so as to be in parallel with the direction of moving the light beam, it will become to easily recognize as to whether the marker 2 is far from the location of the light-beam spot or the marker 2 is close to the location. Thus, the light-beam spot can be led to the marker 2 without any misleading or without going lost its way.

The steps for introducing the light-beam spot to the marker 2 is exemplified in detail hereinbelow.
Referring to FIG. 11

FIG. 11 is the explanatory figure of the alignment steps according to the first embodiment of the present invention (Enlarged plan view of the magnetic head slider). In the FIG. 11, the rough guiding marker 3 is comprised from a backbone portion 3a leading to the marker 2 and plural rib portions 3b disposing so as to fall at right angles with the backbone portion 3a. For instance, supposing the situation that the light-beam spot is located first at a location A in the FIG. 11, reflection from the location A is not so significantly detected, and thereby it is understood that any marker is not located at the location A. After that, the light-beam spot is going to try moving upwardly or downwardly. In this step, if the light-beam spot is moved upwardly, then the light reflection becomes most significant at a location B in the FIG. 11, and thereby it is understood that a sort of marker is located at the location B. On the other hand, if the light-beam spot is moved downwardly, then the light reflection becomes most significant also at a location C in the same FIG. 11, and thereby it is understood that a sort of marker is located at the location C. The algorithm, which has been so far explained, can lead us to recognize the location A is disposed between two rib portions 3b, which are neighbor with each other.

And the next, the light-beam spot is moved toward the different direction falling at right angles with the direction in the above. Namely, the light-beam spot scans in a right and left direction on the FIG. 11. In the same manner as explained in the above, light reflection is maximized at a location D, and thereby the backbone 3b can be recognized on the location D. And also, if the light-beam spot scans up and down, then light-beam spot can be arrived at the marker 2 location. Through the above steps, the light-beam spot is accurately aligned to the marker 2.

In the above embodiment, the rough guiding marker 3 is thought to have several modifications. But, as far as two direction scanning of the light-beam spot, the rough guiding marker 3 is simple but effective if it is comprised from a first line pattern e.g., the backbone portion, elongating to the marker 2 or adjacent to the marker 2 and a second line pattern, e.g., the rib portion, disposing so as to fall at right angles with the first line pattern.
Referring again to FIG. 1

FIG. 1 is a plan view figure (Enlarged plan view figure of a main portion) of the magnetic head of the thermal-assisted magnetic storage device, according to the first embodiment of the present invention. In the FIG. 1, a disc 5 is comprised from transparent material enough to make the light-beam pass therethrough. A very thin magnetic material covers on the disc 5 surface, as a magnetic recording layer 51. The magnetic head 6 is floated just a bit above the rotating disc 5 by small swirls, which is generated by high-speed rotation, and the floating magnetic head 6 can read data from the magnetic recording layer 51. On the other hand, light-beam pickup 7 is disposed on the opposite side of the disc 5, and the light-beam can pass through the transparent disc 5, and thereby it can be aligned to the magnetic head 6. And also, at the same time, it can partially heat up the temperature of the tiny area. Due to the necessity of light-beam exposure in tiny area, coherent laser is favorably applied to the light-beam spot.

Details of the light-beam pickup 7 is as follows. When the light-beam pickup 7 scans, alteration in refection intensity can be recognized. Corresponding to the alteration in refection intensity, FE Signal (Focus Error Signal) is generated. And also, according to the FE Signal, first target is the rough guiding marker (not shown in the figure) on the magnetic head slider surface 61. In accordance with aforementioned algorithm, light-beam scanning will be continued and tracking any marker by driving field lens and referring to alteration in the FE Signal (Focus Error Signal). In more detail, when the system can recognize the alteration in reflection intensity by driving the light-beam pickup 7, FE Signal (Focus Error Signal) will be generated in accordance with the recognition. After the FE Signal (Focus Error Signal) is amplified by amplifier, it is transferred to a servo circuit. The signal is also provided to a control circuit, and thereby an x-y-z stage is moved, if required, by driving the servo circuit so as to promote a bit vibrating the light-beam pickup on a goniometer. Simultaneously, the control circuit outputs a signal to a Laser Diode (LD) activation circuit only when data writing, and thereafter a LD signal (Laser Diode signal), which is output by the LD activation circuit, is transferred to the light-beam pickup to light the Laser Diode, and thereby a desired spot on the magnetic recording layer 51 surface is heated up.
Referring to FIGS. 7 through 10

Figure 7:
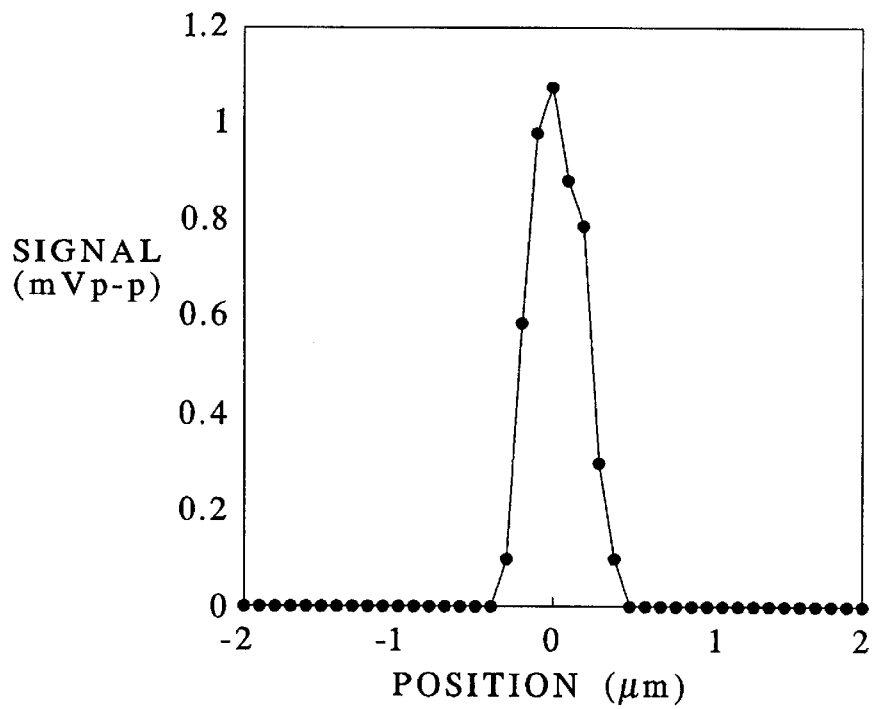
FIG. 7: Tracking profile (No. 1) of the output in case of reading data according to the related art
Figure 8:
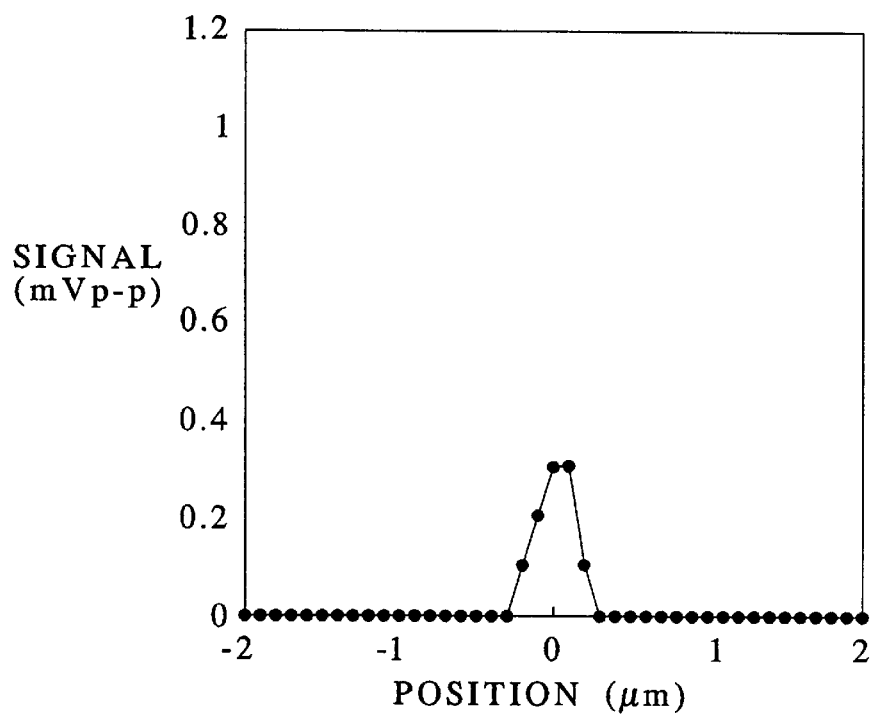
FIG. 8: Tracking profile (No. 2) of the output in case of reading data according to the related art
Figure 9:
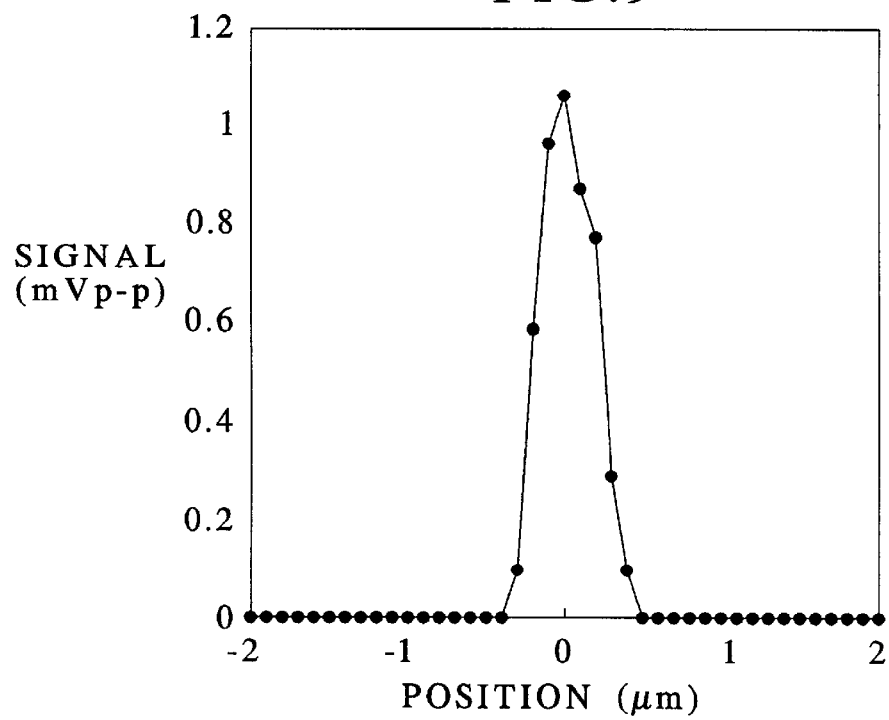
FIG. 9: Tracking profile (No. 1) of the output in case of reading data according to the first embodiment of the present invention
Figure 10:
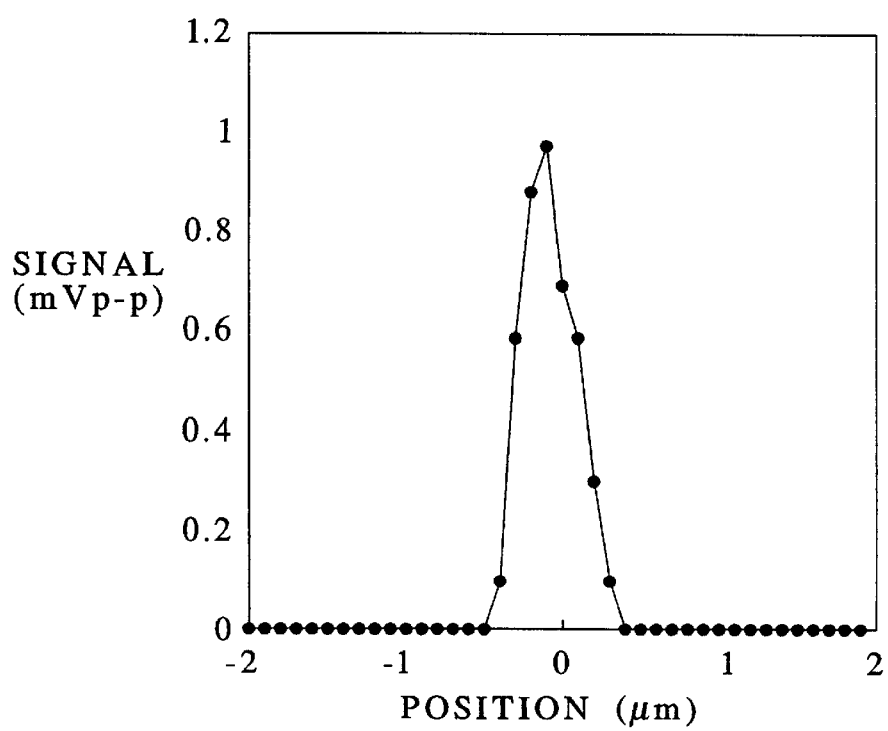
FIG. 10: Tracking profile (No. 2) of the output in case of reading data according to the first embodiment of the present invention

FIG. 7 shows a tracking profile (No. 1) of the output in case of reading data according to the related art, and it illustrates the output's tracking profile, which is observed just after the alignment is completed, without applying the present invention. And also, FIG. 8 shows a tracking profile (No. 2) of the output in case of reading data according to the related art, and it illustrates the output's tracking profile, which is observed one hour after the alignment is completed, without applying the present invention. And further, FIG. 9 shows a tracking profile (No. 1) of the output in case of reading data according to the first embodiment of the present invention, and it is observed just after the alignment is completed. Similarly, FIG. 10 shows a tracking profile (No. 2) of the output in case of reading data according to the first embodiment of the present invention, and it is observed one hour after the alignment is completed. In each of FIGS. 7 through 10, differential in location from the center of the recording portion is scaled on its abscissa, and signal intensity (m V) is scaled on its ordinate. And thereby, each of these figures illustrates alteration in signal intensity in accordance with differential in location.

Comparing between FIG. 9 illustrating the present invention's tracking profile and FIG. 7 illustrating the related art's tracking profile, both of these tracking profiles are the same with each other. These figures teach that both tracking profiles are not different from each other at the time just after the alignment. However, comparing between FIG. 10 illustrating the present invention's tracking profile at one hour later and FIG. 8 illustrating the present invention's tracking profile at one hour later, both of these tracking profiles are significantly different from each other. Namely, according to the related art of FIG. 8, the intensity of the recorded data disposing adjacent to newly recorded datum becomes to be pretty much degraded at one hour after the data recording. On the other hand, according to the present invention of FIG.

10, the intensity of the recorded data is not weakened even at one hour after the data recording.

Now, other embodiments of the present invention will be explained hereinafter in this sequence in detail, and each of following embodiments discloses particularly regarding markers structure on the magnetic head slider surface but other features may be omitted because those are basically the same as aforementioned first embodiment.

Figure 5:
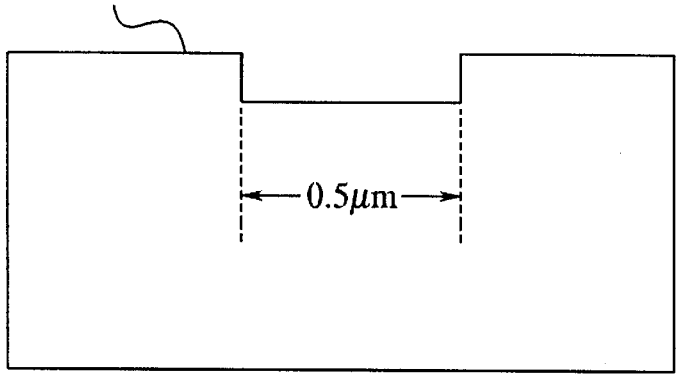
FIG. 5: Cross-sectional view of the magnetic head slider (bump pattern type marker) according to the second embodiment of the present invention

Second Embodiment
Referring to FIG. 5

As a new marker structure being different from the first embodiment so far explained, roughness pattern can also be applied to the maker 2 portion, instead of the above-exemplified metal film, e.g., aluminum film. FIG. 5 is a cross-sectional view figure of the magnetic head slider (bump pattern type marker) according to the second embodiment of the present invention. The method for fabricating the above bump pattern type marker 2 is exemplified as follows. For instance, the desired surface of the magnetic head slider is a bit concaved through well-known dry etching method, and thereby such concave can be used as the marker 2. Otherwise, photoresist film is formed so as to cover the whole surface of the magnetic head slider, and it is patterned through a known photolithographic method so as to form the same shape as desired marker 2, and thereafter, the magnetic head slider surface is entirely etched back by using the photoresist pattern as a mask. As a result of this etching back, marker 2 is patterned as a projected area on the magnetic head slider surface. Except the marker 2 formation, the other entire feature fully takes over the first embodiment. FIB (Focused ion Beam) method or RIE (Reactive Ion Etching) method can be employed for the roughness formation above. In case of RIE method, photoresist film covering on the magnetic head slider is formed through spin-coating, and thereafter, known photolithographic method using the photoresist as a mask is applied, and thereafter, the exposed surface of the magnetic head slider is exposed to the RIE etchant and thereby the exposed surface is etched through RIE method. After the RIE, the photoresist mask is removed by known dry ashing method, e.g., $O_2$ Plasma ashing method. In contrast to anisotropic roughness marker pattern through the above steps, isotropic roughness marker pattern can also realize the present invention. To form such isotropic roughness marker pattern, wet etching is applied. However, anisotropic-etched marker pattern is more favorable than isotropic one, because high peak of reflection intensity will be detected at vertical wall of the anisotropic-etched marker pattern and such vertical wall cannot form through isotropic etching method.

Figure 6:
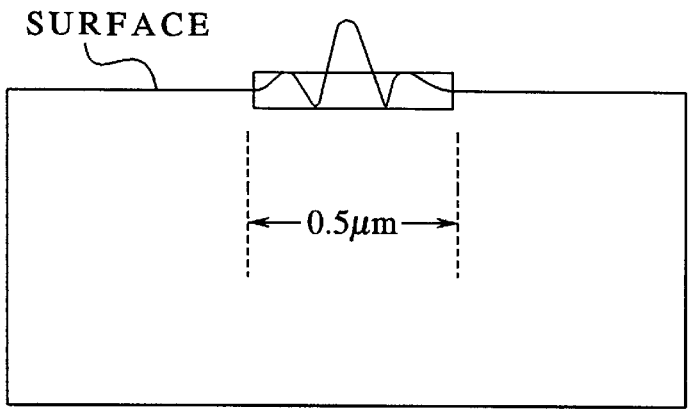
FIG. 6: Cross-sectional view of the magnetic head slider (Laser Bump type marker) according to the third embodiment of the present invention

Third Embodiment
Referring to FIG. 6

As the third embodiment, laser bump marker pattern, which is formed through laser melting, will be exemplified in detail hereinbelow. FIG. 6 is a cross-sectional view figure of the magnetic head slider (Laser Bump type marker) according to the third embodiment of the present invention. As depicted in the FIG. 6, the Laser Bump type marker is formed through following method. A laser spot is exposed selectively to a desired fine area (e.g., 0.5 $\mu$m width) in the plan surface of the magnetic head slider, and thereby the fine area is heated up and melted to form a roughness marker. The above laser method can be effective with respect to easiness of the marker formation.

The present invention has been explained so far by exemplifying each of first, second, and third embodiments. And further, several modifications are thought to be applicable to the present invention, and therefore those modifications will be disclosed hereinafter.

For instance, each of the rib portions of the rough guiding marker is arranged in parallel and at even intervals in the examples of FIGS. 2 and 11. Instead, each of the rib portions can be also arranged in parallel and at different intervals. For instance, closer to the optically singular marker, the shorter interval is applied between two rib portions, which are neighbor with each other. Such example will be explained, referring to FIG. 12, in below.

Referring to FIG. 12

FIG. 12 is an explanatory figure of the first modification of the embodiment (Enlarged plan view of the magnetic head slider). Closer to the optically singular marker 2, the shorter intervals is applied between one rib portion and its neighboring rib portion. In other words, in accordance with distance from the optically singular marker 2, each of the rib portions are arranged so as to alter the interval distance. Such structure can be effective regarding the easiness of approaching the optically singular marker, because the system can recognize even by the interval distance itself regarding how far the light-beam spot location is from the optically singular marker as a target.

In FIG. 12, supposing the situation that the laser spot is located in a location A, laser spot is moved first up and down from the location A, and therethrough the rib portions can be found at locations B and C, and the distance between B and C is calculated and recognized as a interval between rib portions adjacent to the current location of the laser spot. Through the above steps, distance between the laser spot and the optically singular marker in up and down direction can be roughly detected. As disclosed in the above, if the laser spot is moved right and left from the location A, then the backbone portion can be detected. And thereafter, the laser spot can be jumped toward the optically singular marker in one time in accordance with the aforementioned distance calculation.

Figure 13:
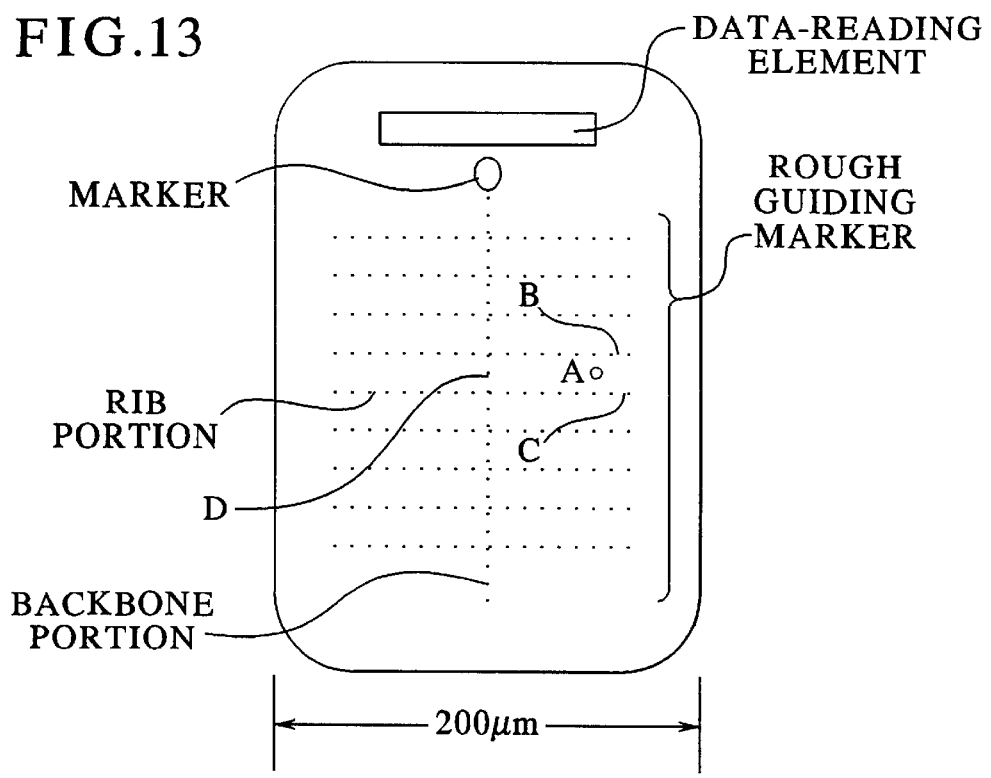
FIG. 13: The explanatory figure of the second modification of the embodiment (Enlarged plan view of the magnetic head slider)

Referring to FIG. 13

FIG. 13 is an explanatory figure of the second modification of the embodiment (Enlarged plan view of the magnetic head slider). This example sketches the rough guiding marker comprising dot lines of reflexible material. Even in case of FIG. 13, laser spot scanning steps are substantially the same as in FIG. 11. Namely, the laser spot is first moved a bit up and down from the initial location A, and therethrough the rib portions at locations B and C can be detected. As a result of the above steps, the system can recognize that the location A is disposed between two rib portions. And thereafter, the laser spot is moved right and left from the location A and thereby the backbone portion can be detected at a location D. After that, the laser spot can be led up to the optically singular marker 2 by the backbone portion. If the arrangement of dots in the dotted line is gradually altered in accordance with distance to the backbone, then the distance to the optically singular marker 2 can be roughly detectable even only through the up and down scanning from the initial position of the laser spot. Moreover, it is also effective way to easily detect the optically singular marker 2 that both the backbone portion and the rib portions are comprised from dotted lines. In case of the dotted backbone portion and the dotted rib portion, if each interval between dots on the backbone and rib portions are changed in accordance with the distance to the optically singular marker 2 or to the backbone portion. This will be explained hereinafter.

Figure 14:
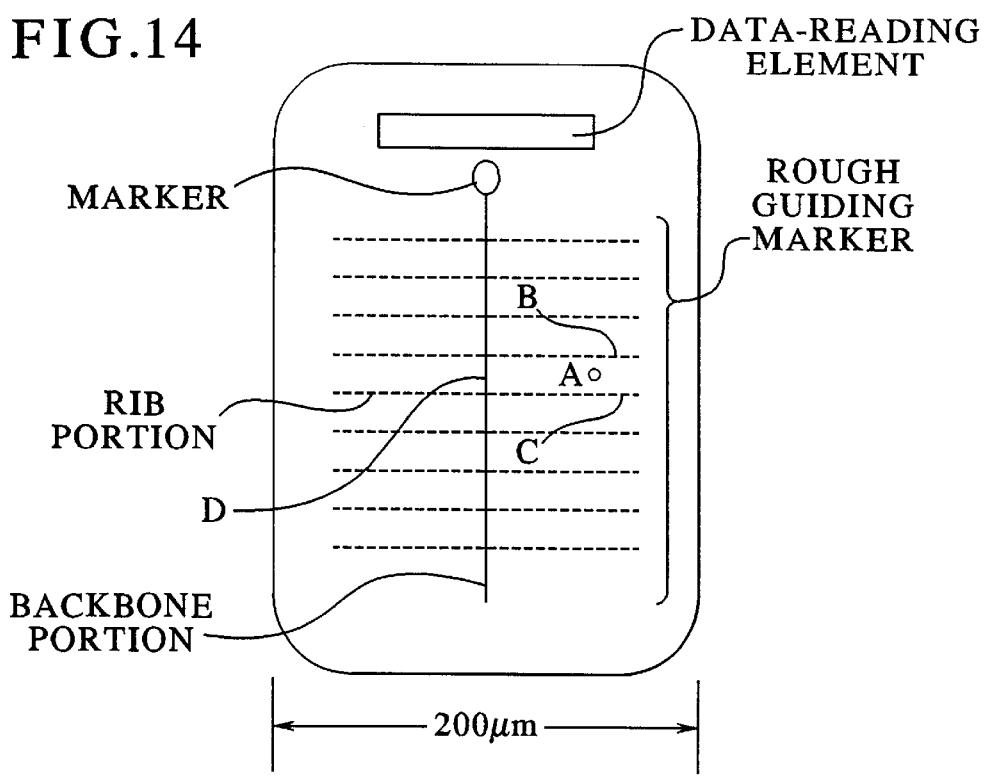
FIG. 14: The explanatory figure of the third modification of the embodiment (Enlarged plan view of the magnetic head slider)

Referring to FIG. 14

FIG. 14 is an explanatory figure of the third modification of the embodiment (Enlarged plan view of the magnetic head slider). In accordance with the example of FIG. 14, the laser spot is first moved up and down from its initial position A, and thus the rib portions can be detected at each of the locations B and C, and thereby the system can recognize that the initial position A is disposed between the locations B and C. And the next, the laser spot is moved right and left, and thus the backbone portion can be detected at the location D. After that, the laser spot is led to the optically singular marker 2 as a target along with the backbone portion. Thus, all of the above steps are substantially the same as in the first and second embodiments. However, if the laser spot is just a bit moved right and left from the locations B and C, which are intersected with the backbone portion, then the distance to the rib portion can be recognized merely by calculating width of dotted line nearest the laser spot.

In more details, when the laser spot is scanned for instance right and left slightly at position B, the system recognizes the distance between the dots on the dotted line. If it is short, then the rib portion is near. On the other hand, if it is long, then the rib portion is far located. There is accompanying effect of can being able to measure the distance to the rib portion at a dash when the distance is measured, tracing to the marker, and shortening the process time until reaching the marker if it is calculated as the distance between dotted lines of the rib portion decreases gradually at a fixed rate toward the backbone.

Figure 15:
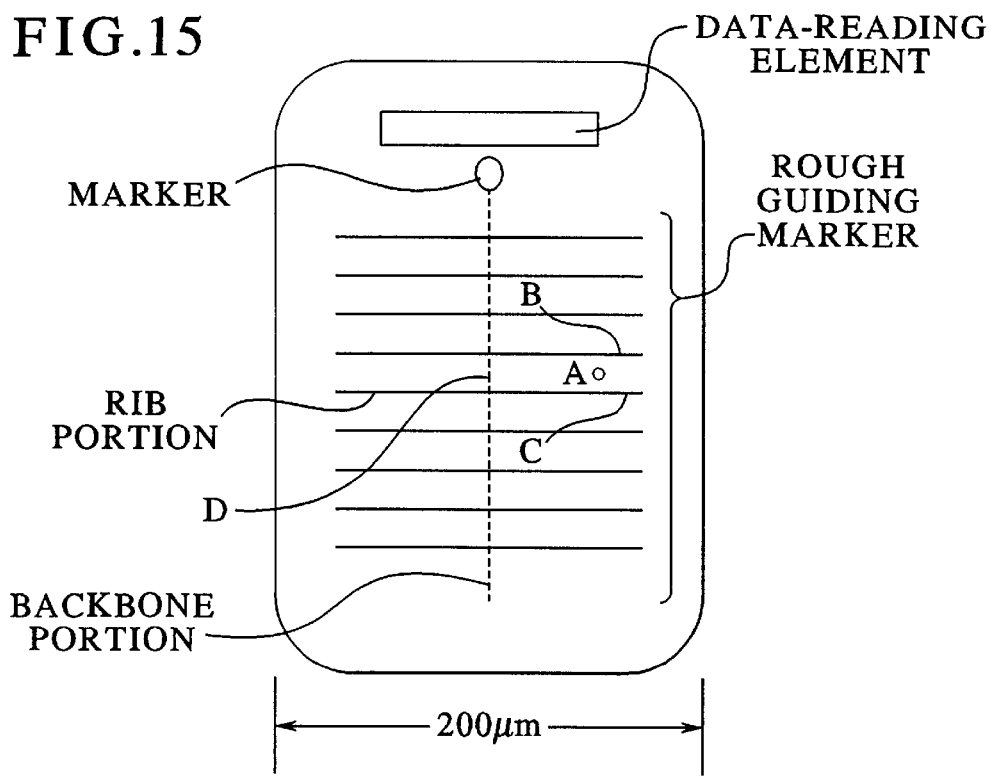
FIG. 15: The explanatory figure of the fourth modification of the embodiment (Enlarged plan view of the magnetic head slider)

Referring to FIG. 15

FIG. 15 is an explanatory figure of the fourth modification of the embodiment (Enlarged plan view of the magnetic head slider). In the example of FIG. 15, one difference from the example of FIG. 14 is that only the backbone becomes like the dotted line. The laser spot which lies to position A first is scanned as well as a current example and the procedure brought close to the marker is basically the same also in this example. Because the distance between dotted lines can be detected when the surface of the backbone is scanned after position D is detected, the thing to know the distance to the marker at once can be done, and however, the material of the marker and the backbone is especially long the distance to the marker and when substance is finished up in equivalence and the reflection condition is the same, very advantageous for shortening the process time until the marker position alignment.

In addition, it is also good to make the rib little zigzag instead of consisting of the above-mentioned dotted line. It is possible, as similarly as aforementioned, to search for the backbone efficiently by knowing the distance to the backbone becoming possible because it measures the distance between the vicinity zigzag adjacent while scanning light if the cycle zigzag is gradually made a short cycle in this situation as it approaches the backbone at the center for instance effect is achieved. Such example will be explained hereinafter, by referring to FIG. 16.

Figure 16:
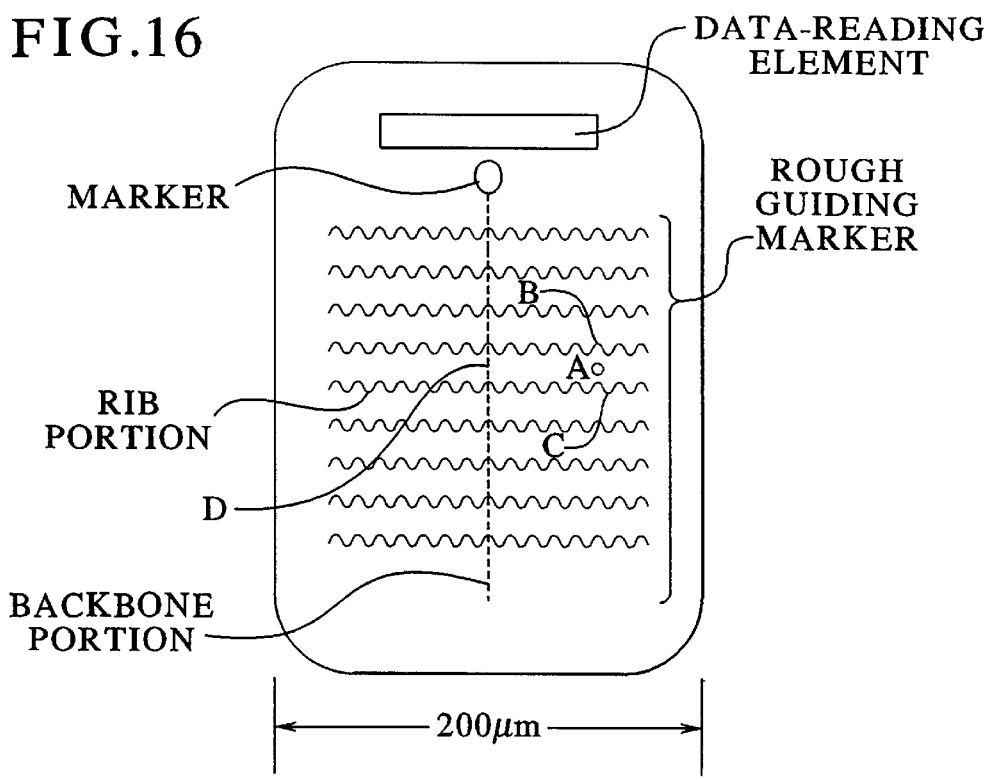
FIG. 16: The explanatory figure of the fifth modification of the embodiment (Enlarged plan view of the magnetic head slider)

Referring to FIG. 16

FIG. 16 is an explanatory figure of the fifth modification of the embodiment (Enlarged plan view of the magnetic head slider). The laser spot which lies to position A first scans vertically first of all and searches for the intersection with the rib portion where zigzag is done. It can be recognized that position A is located between two rib portions that positions B and C are detected thus. The laser spot is scanned from position A to the right and left after this step. And thereafter, the laser spot is a bit scanned right and left from the position A on the figure. In this step, the laser spot have to scan over sufficiently long to right and left compared with the zigzag cycle so as not to misunderstand the zigzag of the rib portion as a part of the backbone portion. According to this procedure, Position D is caught after the scanning sufficiently long to right and left. The steps traced to the optically singular marker after the above is similarly in accordance with the above procedure.

In addition, if it wants to form the marker for a rough movement by simpler process, all rib portions can be lost, and rough guiding marker is comprised only from a backbone portion. That is, it is possible to search for the marker by one respondent by even forming only the marker for one rough movement by which the marker who becomes the target of the position alignment is arranged in parallel in the direction where light-beam is scanned. Moreover, if the width of the backbone portion is narrowed as it gradually approaches the optically singular marker, and the distance from the width of the backbone portion to the optically singular marker is made to be able to be measured, the formation achieves the effect that it is possible to search for the marker by facilitating it efficiently of the marker for a rough movement. This will be explained based upon FIG. 17.

Figure 17:
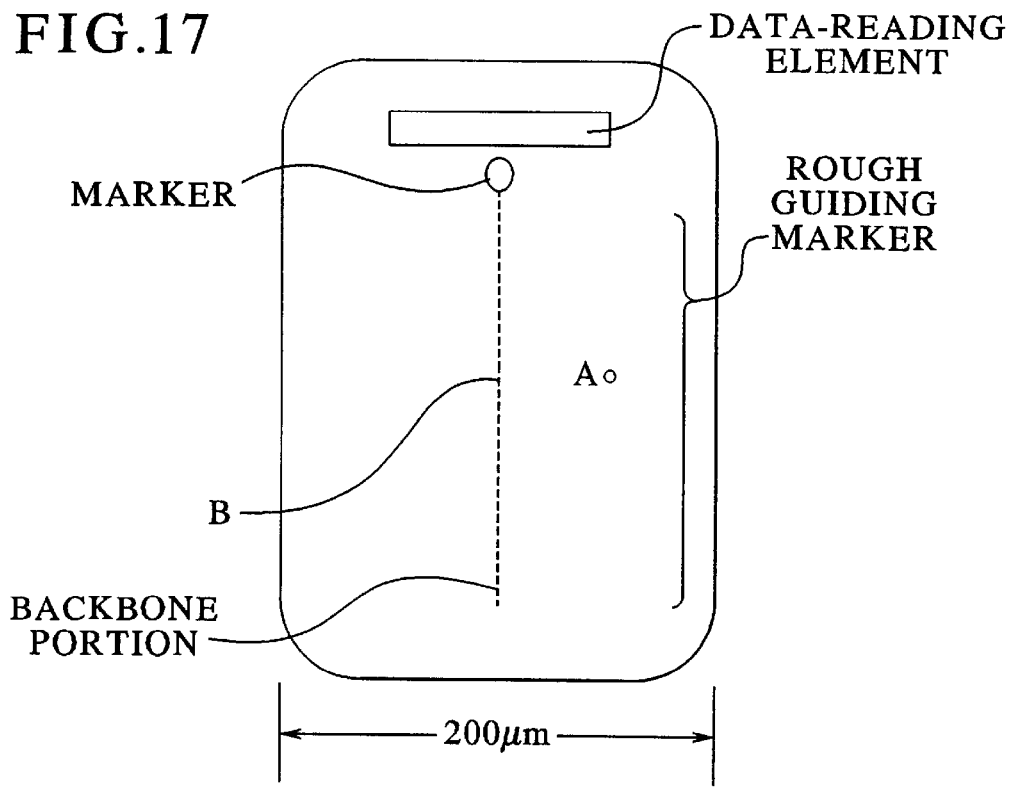
FIG. 17: The explanatory figure of the sixth modification of the embodiment (Enlarged plan view of the magnetic head slider)

Referring to FIG. 17

FIG. 17 is an explanatory figure of the sixth modification of the embodiment (Enlarged plan view of the magnetic head slider). The step by which the laser spot is aligned to the marker is as follows. For instance, first of all, when the laser spot irradiates it to position A first, only enough width scans the laser spot from position A to the right and left. Thus, it can be recognized that the backbone portion exists in position B where a large reflection was obtained. Because there would be occurred the problem that the laser spot unintentionally skips the backbone portion at no pattern portion on dotted line part and therefore it does not recognize the backbone portion, the interval between dot and dot on the backbone portion should be narrower than the diameter of the laser spot. It can be considerably narrow because it is sure to be able to be recognized between dot and dot on the backbone pattern enough if reflecting freely compared with the laser spot diameter.

Figure 18:
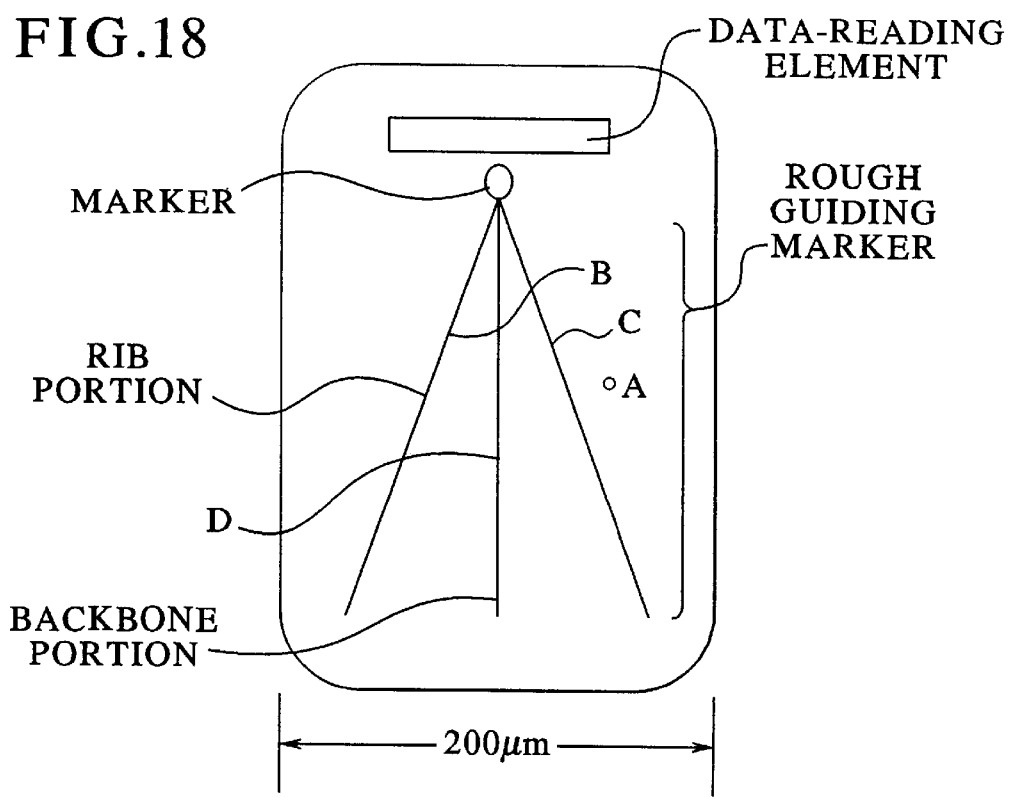
FIG. 18: The explanatory figure of the seventh modification of the embodiment (Enlarged plan view of the magnetic head slider)

Referring to FIG. 18

FIG. 18 is an explanatory figure of the seventh modification of the embodiment (Enlarged plan view of the magnetic head slider). In this example, two rib portions are formed straight to extend from the marker right and left as line symmetry, and the only backbone portion is composed as a whole as a marker for a rough movement. The laser spot which lies to position A is scanned to the right and left very widely, and detects C, D, and B one by one first of all at FIG. 18. Thus, it can be recognized that middle point D is a backbone portion. At the same time, it can recognize the distance from position D to the marker by referring to the distances between C and D, and D and B. And thereby, position alignment to the optically singular marker of the laser spot can be easily and quickly completed in a short time. Easy and fast approach to the optically singular marker is to be accomplished even by this simple marker composition.

Figure 19:
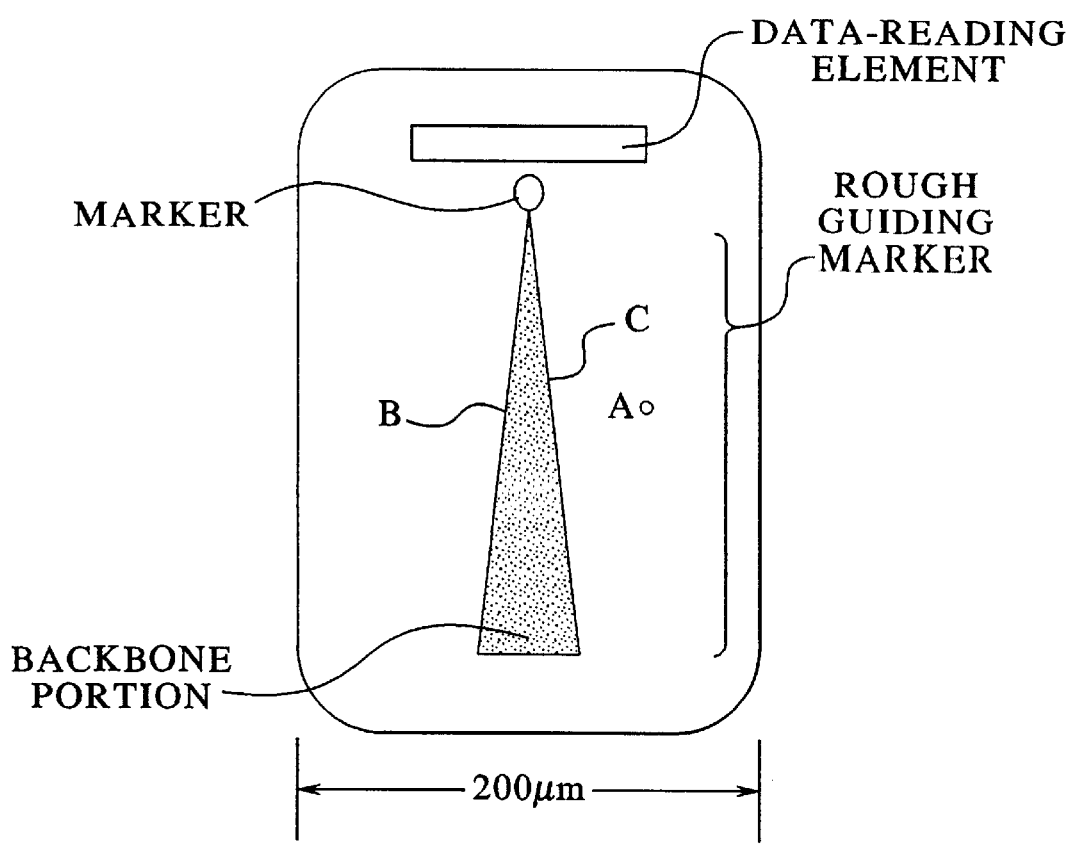
FIG. 19: The explanatory figure of the eighth modification of the embodiment (Enlarged plan view of the magnetic head slider)

Referring to FIG. 19

FIG. 19 is an explanatory figure of the eighth modification of the embodiment (Enlarged plan view of the magnetic head slider). In this example, the point to have made the function of the rib portion in the backbone portion of this embodiment gradually become wide as the backbone parted from the marker, and had feature. In this example, first of all, if the laser spot breaks out first at position A, it scans from position A to the right and left. Because inflection point of reflectivity exists in B and C in this, positions B and C can be considered to be an edge in the backbone portion. In this situation, the thing to know the distance to the marker can be done by measuring the distance between positions B and C. It can reach the marker at last by vertically scanning from the middle point of B and C, and even when misregistration can be detected being caused in the scanned laser spot in the distance from the middle point of B and C to the marker, and the position gap is cruel, the marker finding can be done efficiently. In that situation, if the laser spot came off from the backbone portion at the previous scanning, reflectivity only has to shake the laser spot to the right and left at the position which comes off once though changes. Thus, it is possible to search for the middle point in the direction of width of the backbone if the width of the backbone at a position concerned can be recognized, and the position gap can be corrected easily.

What is claimed is:

1. A thermal-assisted magnetic storage device, comprising:
    a magnetic recording media of transparent material;
    a first marker of material that is optically singular compared with materials therearound;
    a magnetic head disposed on a magnetic head slider facing a recording surface of said magnetic recording media;
    a light-beam pickup facing the other surface of said magnetic recording media, so as to emit light therefrom to the surface of said magnetic recording media;
    a second marker disposed on said magnetic head slider for roughly guiding the light to said first marker;
    wherein an alignment between said light and said magnetic head is performed in accordance with the light reflected from said first marker.

2. The thermal-assisted magnetic storage device as claimed in claim 1, wherein said second marker is arranged in the direction which becomes a standard where light moves, wherein said first marker is arranged straight ahead of the second marker in the direction that becomes the standard.

3. The thermal-assisted magnetic storage device as claimed in claim 1, wherein said second marker comprises:
    a first line part so that said first marker is arranged in one direction which becomes a standard where light moves; and comprising a plurality of lines disposed to have an orderly distance therebetween.

4. The thermal-assisted magnetic storage device as claimed in claim 3, wherein each of plural of said line parts are arranged at equal intervals.

5. The thermal-assisted magnetic storage device as claimed in claim 3, wherein the intervals between the plural of said second line parts are shortened gradually in accordance with distance to said first line part.

6. The thermal-assisted magnetic storage device as claimed in claim 3, wherein at least one of said first and second lines are comprised from a dotted line.

7. The thermal-assisted magnetic storage device as claimed in claim 1, wherein the second marker includes a first line part arranged in one direction which becomes a standard where the light moves.

8. The thermal-assisted magnetic storage device as claimed in claim 7, wherein said first line part is comprised from a dotted line.

9. The thermal-assisted magnetic storage device as claimed in claim 3, wherein said second line part is comprised from a zigzag with a predetermined cycle which gradually increases or gradually decreases.

10. The thermal-assisted magnetic storage device as claimed in claim 9, wherein said cycle is continued from end to end of said second line part.

11. The thermal-assisted magnetic storage device as claimed in claim 8, wherein the length of the solid line part of dotted lines among said first line part spreads at a fixed rate in accordance with distance from said first marker.

12. The thermal-assisted magnetic storage device as claimed in claim 7, wherein the interval between said first line part spreads in accordance with distance from said first marker.

13. The thermal-assisted magnetic storage device as claimed in claim 1, wherein at least one of said first and second markers is comprised from at least one element selected from a group of Al(Aluminum), Ag(Silver), and Pt(Platinum), and thereby it has higher reflectibility compared with surroundings.

14. The thermal-assisted magnetic storage device as claimed in claim 1, wherein at least one of said first and second markers is comprised of a concavity or a bump on said magnetic head slider.

15. The thermal-assisted magnetic storage device as claimed in claim 1, wherein at least of one said first and second markers is comprised of a convex part formed by heating it with high-energy line irradiation.

* * * * *